United States Patent
Oveyssi et al.

(10) Patent No.: US 7,050,270 B1
(45) Date of Patent: May 23, 2006

(54) DISK DRIVE ACTUATOR ARM ASSEMBLY HAVING A PORTION OF THE ARM AT A GREATER DISTANCE FROM A DISK RECORDING SURFACE THAN THE ARM TIP PORTION

(75) Inventors: Kamran Oveyssi, San Jose, CA (US); Chen-Chi Lin, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 190 days.

(21) Appl. No.: 10/286,126

(22) Filed: Oct. 31, 2002

(51) Int. Cl.
*G11B 21/08* (2006.01)

(52) U.S. Cl. .................................................. 360/266
(58) Field of Classification Search ............... 360/266, 360/265.9, 265.7, 266.1, 244.2, 244.3, 244.4
See application file for complete search history.

(56) References Cited

U.S. PATENT DOCUMENTS

| | | | | |
|---|---|---|---|---|
| 5,063,464 A * | 11/1991 | Astheimer et al. | .......... | 360/266 |
| 5,184,265 A * | 2/1993 | Foote et al. | ............. | 360/265.9 |
| 5,877,919 A | 3/1999 | Foisy et al. | | |
| 5,999,372 A * | 12/1999 | Peterson et al. | ......... | 360/265.9 |
| 6,744,606 B1 * | 6/2004 | Lau et al. | .................. | 360/266 |
| 2003/0081356 A1 * | 5/2003 | Shimizu et al. | .......... | 360/265.9 |
| 2003/0218833 A1 * | 11/2003 | Nagahiro et al. | ........ | 360/265.9 |

\* cited by examiner

*Primary Examiner*—Tianjie Chen
(74) *Attorney, Agent, or Firm*—Joshua C. Harrison, Esq.

(57) ABSTRACT

An actuator arm assembly for a disk having a recording surface, the actuator arm assembly includes an actuator body including a bore defining a longitudinal pivot axis and an actuator arm cantilevered from the actuator body. The actuator arm includes an arm major portion cantilevered from the actuator body, an arm tip portion, and an arm tip supporting portion integrally formed with the arm major portion and the arm tip portion, wherein the arm major portion is longitudinally spaced-apart at a greater distance from the recording surface than the arm tip portion.

5 Claims, 5 Drawing Sheets

DISK DRIVE ACTUATOR ARM ASSEMBLY HAVING A PORTION OF THE ARM AT A GREATER DISTANCE FROM A DISK RECORDING SURFACE THAN THE ARM TIP PORTION

BACKGROUND OF THE INVENTION

1. Field of the Invention

This invention relates to disk drives. More particularly, this invention relates to an actuator arm assembly for a disk drive.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 20 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations.

Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a pivot bearing cartridge and, in some cases, a prefabricated head stack assembly which may include the pivot bearing cartridge. Other components of the rotary actuator arrangement are permanent magnets and an arrangement for supporting the magnets to produce a magnetic field for a voice coil motor. The prefabricated head stack assembly includes a coil forming another part of the voice coil motor. The prefabricated head stack assembly also includes an actuator body having a bore through it, and a plurality of actuator arms projecting parallel to each other and perpendicular to the axis of the bore. The prefabricated head stack assembly also includes head gimbal assemblies that are supported by the arms. Each head gimbal assembly includes a suspension ("load beam") and a head supported by the suspension. The suspension typically includes a nut plate ("swage plate") which allows the suspension and hence the head gimbal assembly to be attached to the actuator arm via a swaging operation.

Providing rapid access as the drive capacities increase presents certain challenges such as the reduction of track misregistration ("TMR"). One of the contributors to TMR is the vibration of actuator arms due to high speed air impact between the actuator arms and turbulent airflow as the spindle motor rotates the disk. The air pressure difference due to turbulent airflow around a given actuator arm generates forces on the arm which causes the arm to vibrate.

SUMMARY OF THE INVENTION

A disk drive having a recording surface is disclosed. The disk drive comprises an actuator arm assembly that includes a bore defining a pivot axis and an actuator arm positioned over the recording surface. The actuator arm has a total length in a direction radial to the bore. The actuator arm also has a total width in a direction orthogonal to the length and orthogonal to the pivot axis. The actuator arm includes a proximate region and a distal region. The proximate region spans the total width of the actuator arm and is closer to the pivot axis than the distal region. The proximate region extends radially over the recording surface for a greater radial distance than does the distal region. The actuator arm is separated from the recording surface in a direction parallel to the pivot axis in the proximate region by at least a first clearance spanning the total width of the actuator arm, and by a second clearance in the distal region, the first clearance being greater than the second clearance.

DESCRIPTION OF PREFERRED EMBODIMENTS

Figure 1:
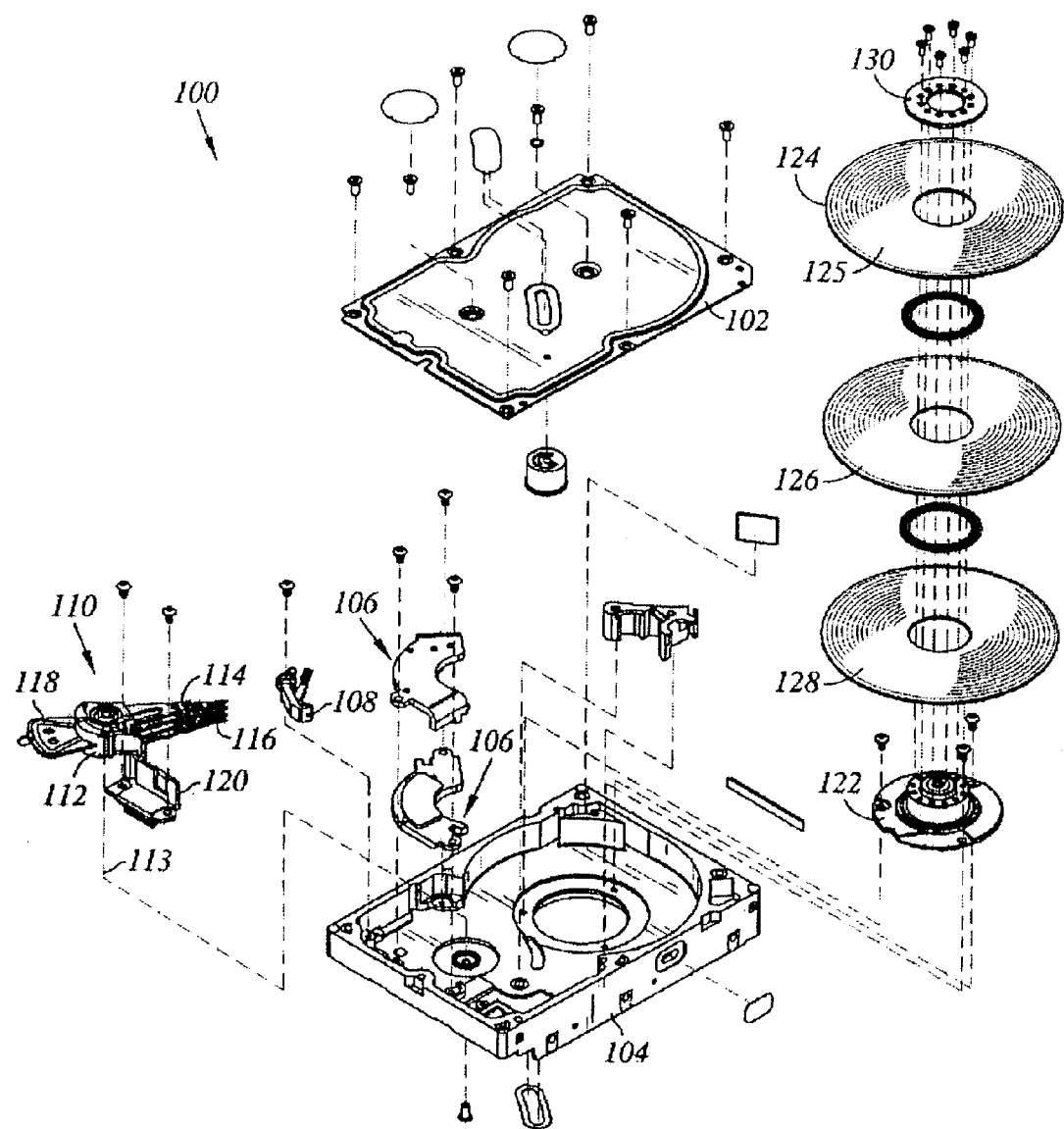
FIG. 1 is an exploded view of a disk drive incorporating an embodiment of this invention.

With reference to FIG. 1, a disk drive 100 includes a base 104, a spindle motor 122 attached to base 104, a disk 124 attached to spindle motor 122, disk 124 including a recording surface 125, and a head stack assembly 110. Head stack assembly 110 includes an actuator body 112, a coil portion 118 cantilevered from actuator body 112, and an actuator arm 114 cantilevered from actuator body 112 in an opposite direction from coil portion 118. Actuator arm 114 includes an arm tip portion 128 (see FIG. 2A) and a suspension supporting portion 121 (see FIG. 2A) attached to arm tip portion 128. Suspension supporting portion 121 includes a nut plate 124 and a rigid spacer portion 122 attached to nut plate 124, rigid spacer portion 122 having a thickness greater than nut plate 124 (see FIG. 2A). Head stack assembly 110 further includes a suspension 118 supported by suspension supporting portion 121 (see FIG. 2A).

Continuing with FIG. 1, disk drive 100 further includes a cover 102, a voice coil motor (VCM) plate portion 106 which includes VCM plates with one or more magnets suitably attached. Disk drive 100 further includes a latch 108, a printed circuit board assembly (not shown) attached to the bottom of base 104 and a disk clamp 130 for clamping the disks which in the embodiment shown, includes three disks 124, 126, and 128. Head stack assembly 110 further includes a bore defining a longitudinal pivot axis 113, a pivot bearing cartridge installed in the bore, a head gimbal assembly 116, and a flex bracket 120 attached to actuator body 112 via a flex circuit cable.

Figure 2A:
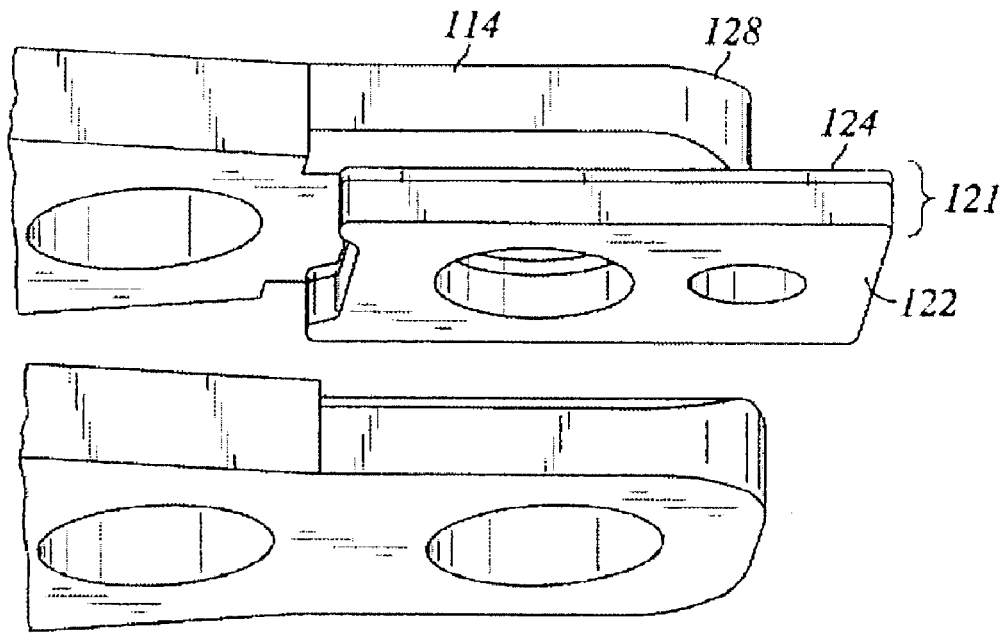
FIGS. 2A–2B show respective portions of the head stack assembly of FIG. 1 according to an embodiment of this invention.
Figure 2B:
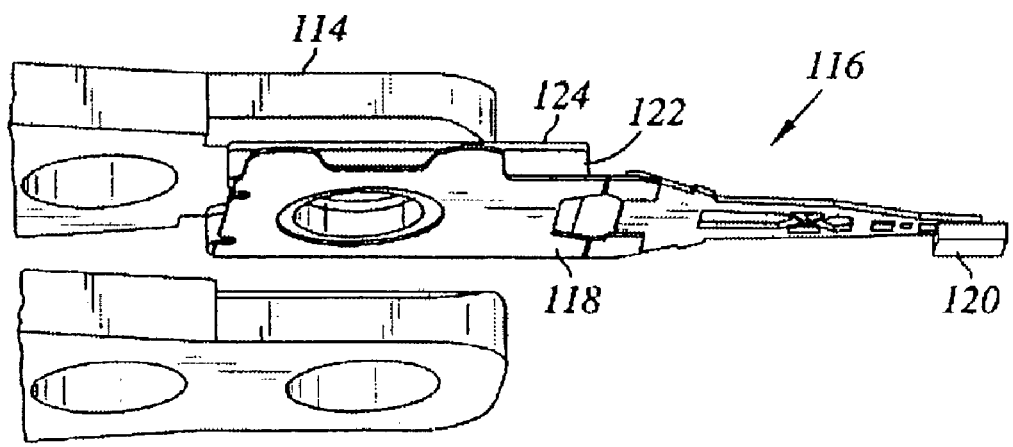

With reference to FIGS. 2A–2B, a portion of head stack assembly 110 shown in FIG. 1 includes actuator arm 114 having arm tip portion 128 and head gimbal assembly 116. Head gimbal assembly 116 includes suspension 118 and a head 120 attached to a distal end of suspension 118. In the embodiment shown, nut plate 124 is attached to arm tip portion 128 via a swaging operation and rigid spacer portion 122 is between nut plate 124 and suspension 118. Suitably, rigid spacer portion 122 may be attached to nut plate 124 by welding or adhesive and rigid spacer portion 122 may also be attached to suspension 118 by welding or adhesive. In accordance with one embodiment, rigid spacer portion 122 has a thickness greater than nut plate 124 by a factor of about 5. Suitably, rigid spacer portion 122 may be formed from a metal such as aluminum, magnesium or stainless steel or from a plastic material.

In accordance with another embodiment, rigid spacer portion 122 and nut plate 124 may be reversed such that rigid spacer portion 122 is attached to arm tip portion 128 and nut plate 124 is between rigid spacer portion 122 and suspension 118. In accordance with another embodiment, rigid spacer portion 122 may be attached to arm tip portion 128 via adhesive or glue, nut plate 124 may be attached to rigid spacer portion 122 via adhesive or glue, and nut plate 124 attached to suspension 118 via welding. Preferably, the adhesive or glue used is electrically conductive to provide a suitable ground path between head gimbal assembly 116 and actuator arm 114. Significantly, a rigid spacer portion, such as rigid spacer portion 122, allows an actuator arm, such as actuator arm 114, to be longitudinally spaced-apart from a disk recording surface at a greater distance than would be possible without the rigid spacer portion. As a result, the vibrations of the actuator arm decrease as the disk rotates.

Figure 3A:
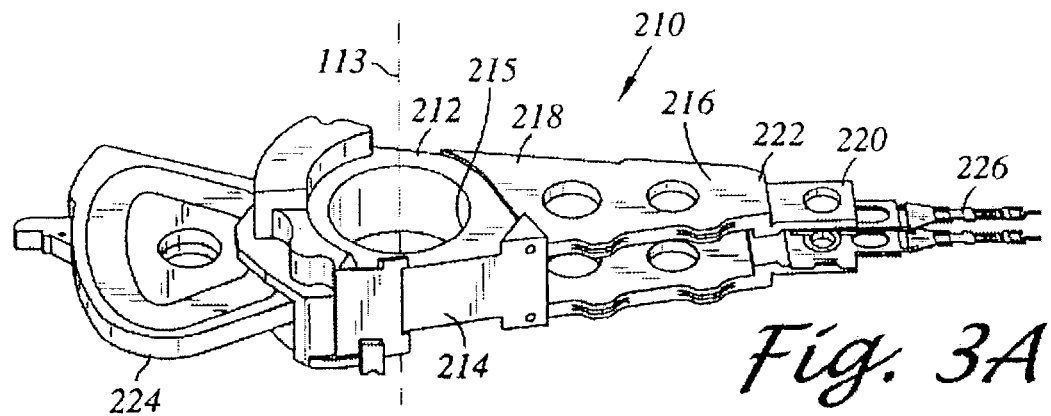
FIG. 3A is a perspective view of a portion of a head stack assembly according to another embodiment of this invention.
Figure 3B:
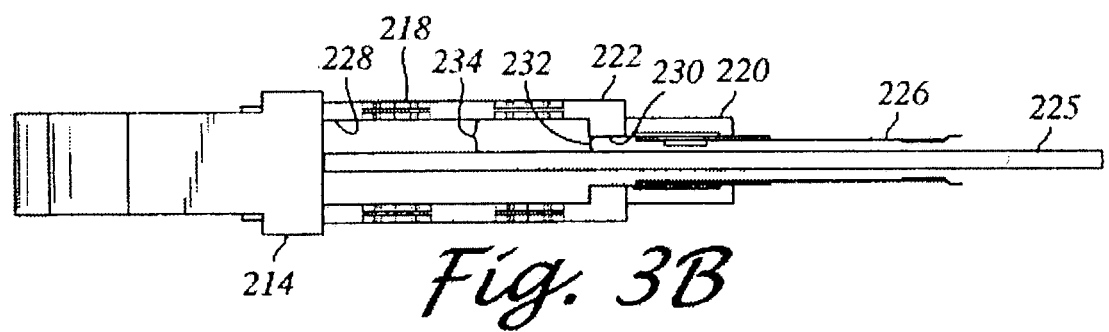
FIG. 3B is a side view of FIG. 3A in conjunction with a disk.

With reference to FIGS. 3A–3B, a head stack assembly 210 includes an actuator arm assembly 212. Actuator arm assembly 212 includes an actuator body 214 including a bore 215 defining a longitudinal pivot axis 113, and an actuator arm 216 cantilevered from actuator body 214. Actuator arm 216 includes an arm major portion 218 cantilevered from actuator body 214, an arm tip portion 220, and an arm tip supporting portion 222 integrally formed with arm major portion 218 and arm tip portion 220, wherein arm major portion 218 is longitudinally spaced-apart at a greater distance from a recording surface than arm tip portion 220. Head stack assembly 210 further includes a suspension 226 coupled to arm tip portion 220, and a head (not shown) coupled to suspension 226. Head stack assembly further includes a pivot bearing cartridge (not shown) installed in bore 215. Suitably, arm tip supporting portion 222 may be formed by a machining or bending operation.

Continuing with FIGS. 3A–3B, actuator arm assembly 212 further includes a coil portion 224 which includes a coil overmolded in plastic. As shown in the embodiment, each actuator arm 216 includes a generally uniform thickness and arm tip portion 220 includes an arm tip planar surface 230 facing a recording surface 225 and longitudinally spaced-apart at a first distance 232 from recording surface 225, and wherein arm major portion 218 includes an arm major planar surface 228 facing recording surface 225, the arm major planar surface being longitudinally spaced-apart from recording surface 225 at a second distance 234 which is greater than the first distance by a factor of about 2.

Figure 4:
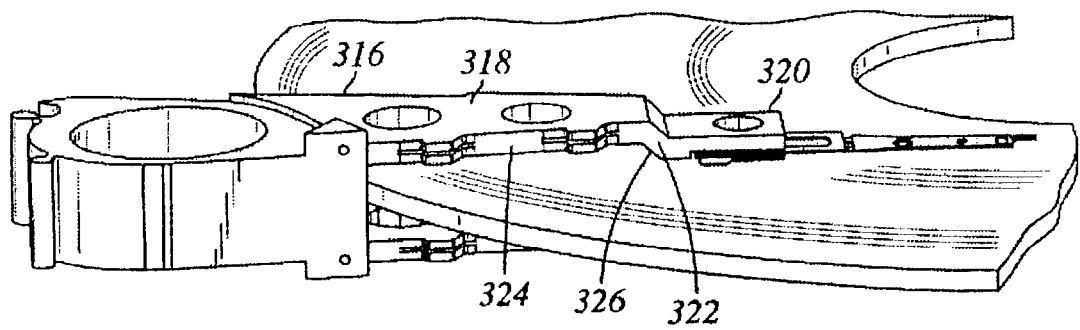
FIG. 4 is a perspective view of a portion of a head stack assembly according to another embodiment of this invention, in conjunction with a disk.

With reference to FIG. 4, a portion of a head stack assembly according to another embodiment is shown, in conjunction with a disk. As shown, an actuator arm 316 includes an arm major portion 318, an arm tip portion 320, and an arm tip supporting portion 322 integrally formed with arm major portion 318 and arm tip portion 320. Arm major portion 318 includes an arm major planar surface 324 facing a recording surface 325 and arm tip supporting portion 322 includes a surface 326 sloped relative to arm major planar surface 324.

Figure 5:
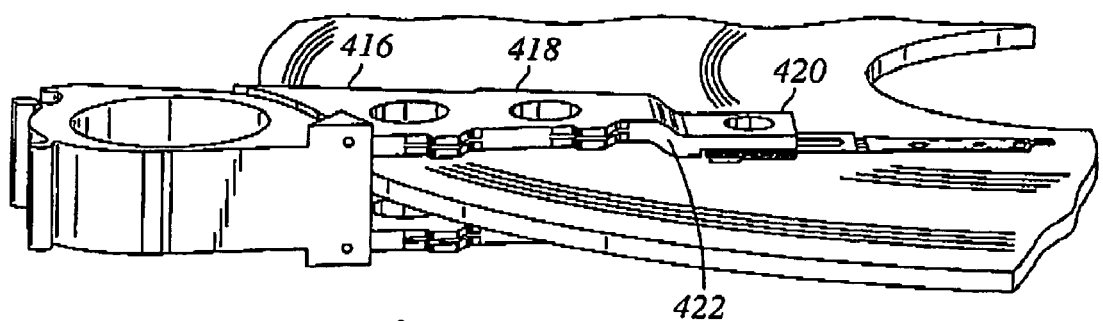
FIG. 5 is a perspective view of a portion of a head stack assembly according to another embodiment of this invention, in conjunction with a disk.

With reference to FIG. 5, a portion of a head stack assembly according to another embodiment is shown, in conjunction with a disk. As shown, an actuator arm 416 includes an arm major portion 418, an arm tip portion 420, and an arm tip supporting portion 422 which is curved rather than sloped as shown in FIG. 4.

Figure 6A:
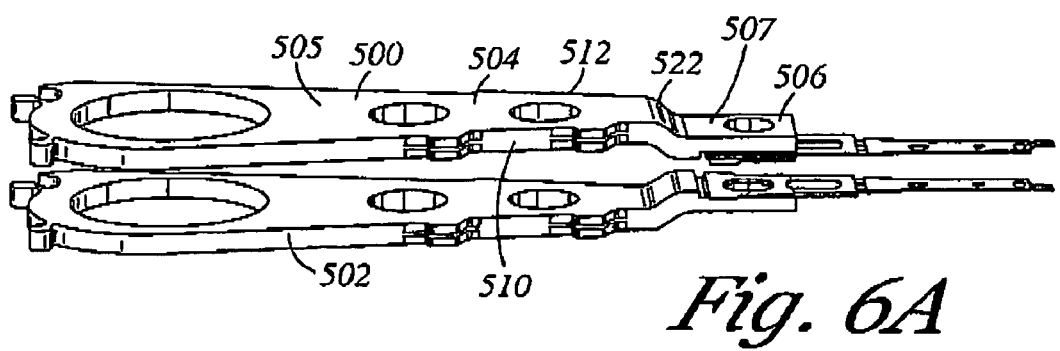
FIG. 6A is a perspective view of a pair of actuator arms according to another embodiment of this invention, in conjunction with suspensions.
Figure 6B:
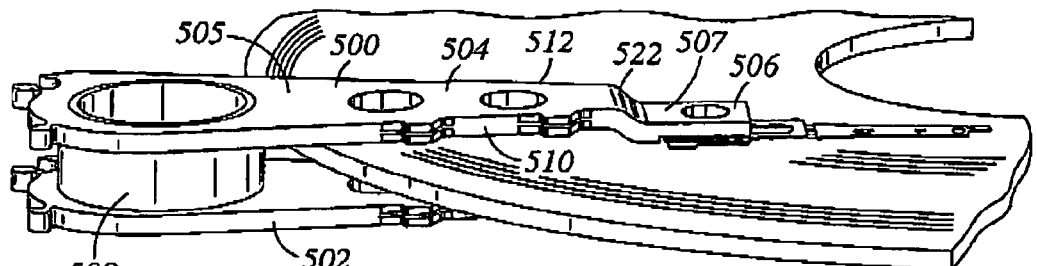
FIG. 6B is a perspective view of FIG. 6A in conjunction with an actuator body and a disk.

With reference to FIGS. 6A–6B, a portion of a head stack assembly according to another embodiment is shown, in conjunction with a disk, in which individual actuator arms 500, 502, suitably formed by a stamping process, are stacked up to form an actuator arm assembly. In one embodiment, each actuator arm is a unitary stamped actuator arm. Actuator arm 500 includes an arm major portion 504 having an arm major planar surface 505 facing away from recording surface, arm major planar surface 505 extending laterally from a first side 510 of arm major portion 504 to a second side 512 of arm major portion 504, an arm tip portion 506 having an arm tip planar surface 507 facing away from recording surface, and an arm tip supporting portion 522 integrally formed with arm major portion 504 and arm tip portion 506. As shown in FIG. 6B, actuator arms 500, 502 are stacked up around an actuator body 508. An overmolded coil portion (not shown) which is cantilevered in an opposite direction from the actuator arms may be used to secure actuator arms 500, 502 to actuator body 508.

Figure 7A:
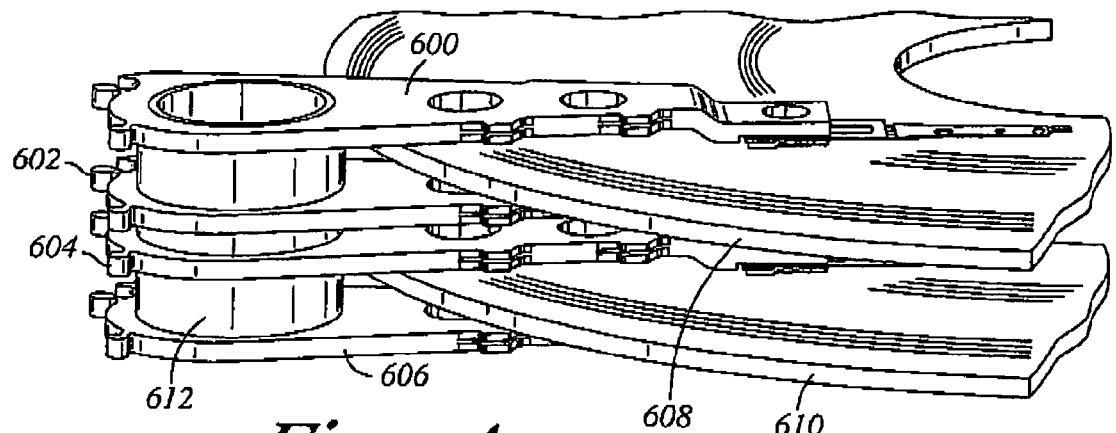
FIG. 7A is a perspective view of a portion of a head stack assembly according to another embodiment of this invention, in conjunction with a pair of disks.
Figure 7B:
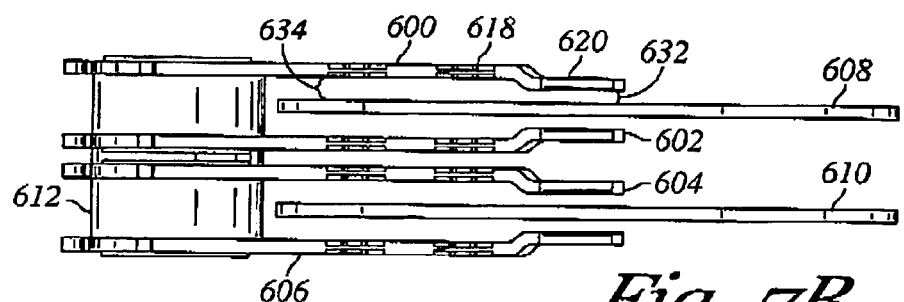
FIG. 7B is a side view of FIG. 7A.

With reference to FIGS. 7A–7B, a portion of a head stack assembly according to another embodiment is shown, in conjunction with a plurality of disks 608, 610. Each individual actuator arm 600, 602, 604, and 606 is stacked up around an actuator body 612. As shown, an arm major portion 618 of an actuator arm, such as actuator arm 600, is longitudinally spaced-apart at a distance 634 greater from a recording surface of disk 608 than a distance 632 of its arm tip portion 620. In an alternative embodiment, the two middle arms 602, 604 may be a single actuator arm.

Suitably, an arm tip supporting portion, such as the arm tip supporting portions described above, may be formed by a machining or bending operation. Significantly, since an arm major portion, such as arm major portion 218, is longitudinally spaced-apart at a greater distance from a recording surface than an arm tip portion, such as arm tip portion 220, the vibrations of the actuator arm decrease as the disk rotates.

We claim:

1. A disk drive comprising:
    a disk having a recording surface;
    an actuator arm assembly including
        a bore defining a pivot axis; and
        an actuator arm positioned over the recording surface,
            the actuator arm having a total length in a direction radial to the bore,
            the actuator arm having a total width in a direction orthogonal to the length and orthogonal to the pivot axis,
            the actuator arm including a proximate region and a distal region, the proximate region spanning the total width of the actuator arm and being closer to the pivot axis than the distal region, the proximate region extending radially over the recording surface for a greater radial distance than does the distal region;
            the actuator arm being separated from the recording surface in a direction parallel to the pivot axis in the proximate region by at least a first clearance spanning the total width of the actuator arm, and by a second clearance in the distal region, the first clearance being greater than the second clearance.

2. The disk drive of claim 1, wherein the first clearance is at least twice the second clearance.

3. The disk drive of claim 1, wherein the actuator arm includes an inclined surface that is sloped relative to the recording surface such that the inclined surface is neither normal to nor parallel to the recording surface, and such that a separation between the inclined surface and the recording surface in a direction parallel to the pivot axis decreases with increasing radial distance from the bore but is approximately constant along the total width at a fixed radial distance from the bore.

4. The disk drive of claim 1, wherein the proximate region and the distal region are portions of the same unitary structure.

5. The disk drive of claim 1, wherein the actuator arm is separated from the recording surface in a direction parallel to the pivot axis in the proximate region by a clearance that is approximately constant over the total width of the actuator arm.

* * * * *